United States Patent [19]

Dantinne et al.

[11] Patent Number: 5,294,358
[45] Date of Patent: Mar. 15, 1994

[54] COMPOSITIONS CONTAINING 1,1,1,2-TETRAFLUOROETHANE AND METHYL CHLORIDE AND USE OF THESE COMPOSITIONS

[75] Inventors: Paul Dantinne, Brussels; Pierre Barthelemy, Jodoigne; Dominique Balthasart, Brussels, all of Belgium

[73] Assignee: Solvay (Société Anonyme), Brussels, Belgium

[21] Appl. No.: 814,456

[22] Filed: Dec. 30, 1991

[30] Foreign Application Priority Data

Jan. 18, 1991 [BE] Belgium ................ 09100039

[51] Int. Cl.$^5$ .................. C09K 5/04; C08J 9/14
[52] U.S. Cl. ........................ 252/67; 62/114; 252/162; 252/172; 252/305; 252/364; 252/DIG. 9; 264/53; 264/DIG. 5; 521/98; 521/131; 521/910
[58] Field of Search ............. 252/67, 162, 172, 305, 252/364, DIG. 9; 62/114; 264/53, DIG. 5; 521/98, 131, 910

[56] References Cited

U.S. PATENT DOCUMENTS

| 2,547,887 | 4/1951 | Reed | 62/178 |
|---|---|---|---|
| 2,885,427 | 5/1959 | Ruh et al. | 260/653.7 |
| 4,428,854 | 1/1984 | Enjo et al. | 252/69 |
| 4,454,052 | 6/1984 | Shoji et al. | 252/67 |
| 4,482,465 | 11/1984 | Gray | 252/67 |
| 4,771,080 | 9/1988 | Ibuki et al. | 521/56 |
| 4,810,403 | 3/1989 | Bivens et al. | 252/67 |
| 5,006,568 | 4/1991 | Fukazawa et al. | 521/78 |

FOREIGN PATENT DOCUMENTS

| 271120 | 8/1989 | Fed. Rep. of Germany | 252/67 |
|---|---|---|---|
| 52-070466 | 6/1977 | Japan | 252/67 |
| 63-308085 | 12/1988 | Japan | 252/67 |
| 2113037 | 4/1990 | Japan . | |

OTHER PUBLICATIONS

Japanese Patent Office, File Suppliers Japs, Tokyo, JP; & JP-A-1 139 539 (Asahi Glass Co., Ltd.) Jun. 1989.
Japanese Patent Office, File Suppliers Japs, Tokyo, JP; & JP-A-60 110 732 (Asahi Kasei Kogyo K.K.) Jun. 1985.
Japanese Patent Office, File Suppliers Japs, Tokyo, JP; & JP-A-57 020 333 (Teijin Ltd.) Feb. 1982.

*Primary Examiner*—Linda Skaling
*Attorney, Agent, or Firm*—Spencer, Frank & Schneider

[57] ABSTRACT

A composition including from 40 to 55 mol % of 1,1,1,2-tetrafluoroethane and from 45 to 60 mol % of methyl chloride; and a composition including from 68 to 75 mol % of 1,1,1,2-tetrafluoroethane and from 25 to 32 mol % of methyl chloride. These compositions are useful as porogenic agents for polystyrene, as refrigerating fluids, and as blowing agents for polyurethane and polyolefin foams.

4 Claims, 2 Drawing Sheets

COMPOSITIONS CONTAINING 1,1,1,2-TETRAFLUOROETHANE AND METHYL CHLORIDE AND USE OF THESE COMPOSITIONS

BACKGROUND OF THE INVENTION

1. Field of the Invention

The invention relates to compositions containing 1,1,1,2-tetrafluoroethane and the use of these compositions.

2. Description of the Related Art

Perhalogenated chlorofluorocarbons have been used in refrigeration equipment for more than fifty years, however, the risks to the environment from some of these compounds are now known. Compounds which could replace these chlorofluorocarbons are thus sought.

1,1,1,2-Tetrafluoroethane is known as a refrigerant (U.S. Pat. No. 2,885,427), having a boiling point of $-26.3°$ C. However, it has the disadvantages of having a relatively high (0.26) "greenhouse warming potential" (GWP), which makes it susceptible to contribute to the greenhouse effect, of having a relatively low volumetric refrigerant output, at least lower than CFC 12, which makes it necessary to employ more refrigerant to obtain a system of equivalent output, and of having a relatively low thermodynamic efficiency, at least lower than that of CFC 12, which results in an increase in the consumption of energy.

The present invention has the object of providing compositions which do not have the disadvantages of the previous products.

SUMMARY OF THE INVENTION

The present invention relates to compositions containing 1,1,1,2-tetrafluoroethane and methyl chloride.

The present invention relates more particularly to an azeotropic or pseudo-azeotropic composition containing 1,1,1,2-tetrafluoroethane and methyl chloride.

The compositions according to the invention usually contain more than 10 mol % of 1,1,1,2-tetrafluoroethane. Generally, they contain more than 20 mol % of 1,1,1,2-tetrafluoroethane. Preferably, they contain more than 30 mol % of 1,1,1,2-tetrafluoroethane.

Compositions according to the invention which have given good results generally contain from 40 to 55 mol % of 1,1,1,2-tetrafluoroethane and from 45 to 60 mol % of methyl chloride. Preferably, these compositions contain from 45 to 50 mol % of 1,1,1,2-tetrafluoroethane and from 50 to 55 mol % of methyl chloride. A very particularly preferred composition, measured at atmospheric pressure, contains 48 mol % of 1,1,1,2-tetrafluoroethane ($\pm -1$ mol %) and 52 mol % of methyl chloride. Such a composition forms an azeotrope of which the boiling point rises to $-28.5°$ C.($\pm -1°$ C.) at a pressure of 101.3 kPa.

Other compositions according to the invention which have given good results generally contain from 55 to 80 mol % of 1,1,1,2-tetrafluoroethane and from 20 to 45 mol % of methyl chloride. Preferably, these compositions contain from 68 to 75 mol % of 1,1,1,2-tetrafluoroethane and from 25 to 32 mol % of methyl chloride. A particularly preferred composition amongst these is a pseudoazeotropic composition which contains 71.5 mol % of 1,1,1,2-tetrafluoroethane ($\pm 1$ mol %) and 28.5 mol % of methyl chloride, measured at atmospheric pressure. This composition forms a pseudoazeotrope of which the boiling point rises to $-27°$ C. ($\pm -1°$ C.) at atmospheric pressure.

DESCRIPTION OF THE PREFERRED EMBODIMENTS

The different compositions according to the invention can also contain, if appropriate, one or more stabilisers, of which the exact nature depends principally on the contemplated use of the composition.

The nature of these stabilisers is known to the person skilled in the art and corresponds to those usually used to stabilise either 1,1,1,2-tetrafluoroethane, or chlorinated products containing 1 to 2 carbon atoms, such as methyl chloride.

Generally, the compositions according to the invention contain from 0.001 to 10% by weight of stabilisers and preferably from 0.1 to 5% by weight.

The compositions according to the invention can also contain, if appropriate, one or more other additives of which the exact chemical nature depends principally on the future use of the composition.

Additives particularly used are a saturated or unsaturated aliphatic hydrocarbon such as pentane, isopentane, hexane, isohexane, neohexane, heptane, 2,3-dimethylbutane or cyclopentane; a nitroalkane such as nitromethane, nitroethane or nitropropane; a triazole such as 1,2,3-benzotriazole; an amine such as diethylamine, triethylamine, isopropylamine, butylamine, diisopropylamine or isobutylamine; an amylene; an alcohol such as methanol, ethanol, n-propyl alcohol, n-butyl alcohol, i-butyl alcohol; a phosphite such as triphenyl phosphite or tributyl phosphite; an ether such as tetrahydrofuran, methylal, 1,3-dioxolane or 1,4-dioxane; an epoxide such as 1,2-epoxybutane, 1,2-epoxypropane, 1,2-butylene oxide or epichlorohydrin; a ketone such as acetone, methyl ethyl ketone or methyl butyl ketone; an ester such as methyl acetate, methyl formate, ethyl formate, ethyl acetate, propyl acetate or butyl acetate, a furan such as 2-methylfuran, a pyrrole such as N-methylpyrrole or a chlorinated or fluorinated hydrocarbon such as dichloromethane, trichloroethane or trichloroethylene.

Generally, the compositions according to the invention contain from 0.01 to 40% by weight of additives and preferably from 0.1 to 30% by weight.

The compositions according to the invention can also contain, if appropriate, one or more surface-active agents, one or more emulsifying agents, one or more cleaning additives and water; the nature of these depending principally on the use of the composition.

The azeotropic composition which contains 48 mol % of 1,1,1,2-tetrafluoroethane and 52 mol % of methyl chloride is slightly flammable. The compositions which contain more than 55 mol % of 1,1,1,2-tetrafluoroethane have flammability limits (measured in a sphere of 200 mm diameter) of less than 17 vol% or are non-flammable (test carried out according to EEC directive 84/449 test A11). With regard to the pseudo-azeotropic composition which contains more than 71.5 mol % of 1,1,1,2-tetrafluoroethane, this is non-flammable.

1,1,1,2-Tetrafluoroethane and methyl chloride which form the new compositions according to the invention are known compounds. Preferably, they are employed in the composition in the form of compounds sufficiently pure to avoid harmful effects during the use of the composition as a refrigerating fluid or to affect the azeotropic properties of the composition.

The invention also relates to the use of the compositions containing 1,1,1,2-tetrafluoroethane and methyl chloride as fluid refrigerants, as a blowing agent for polyurethane foams, as a porogenic agent for polystyrene, as a propellant for packaging under pressure, and as a blowing agent for polyolefin foams in particular.

Good results have been obtained during the use of the compositions according to the invention as a refrigerating fluid and more particularly during the use of azeotropic or pseudo-azeotropic compositions, such as those defined above.

The compositions according to the invention can replace the CFC 12 used in the refrigeration field as a refrigerating fluid without it being necessary to modify the compressors or the size of the existing equipment. The compositions according to the invention are not considered as harmful to the environment.

In addition, 1,1,1,2-tetrafluoroethane does not contain any chlorine and therefore has an "ozone depletion potential" equal to zero; it therefore conforms in this respect to the need created by the Montreal Protocol. 1,1,1,2-Tetrafluoroethane is non-flammable and has a very low toxicity.

The azeotropic or pseudo-azeotropic property of the compositions according to the invention carries with it certain known advantages.

The invention is illustrated by the following examples.

EXAMPLE 1

Figure 1:
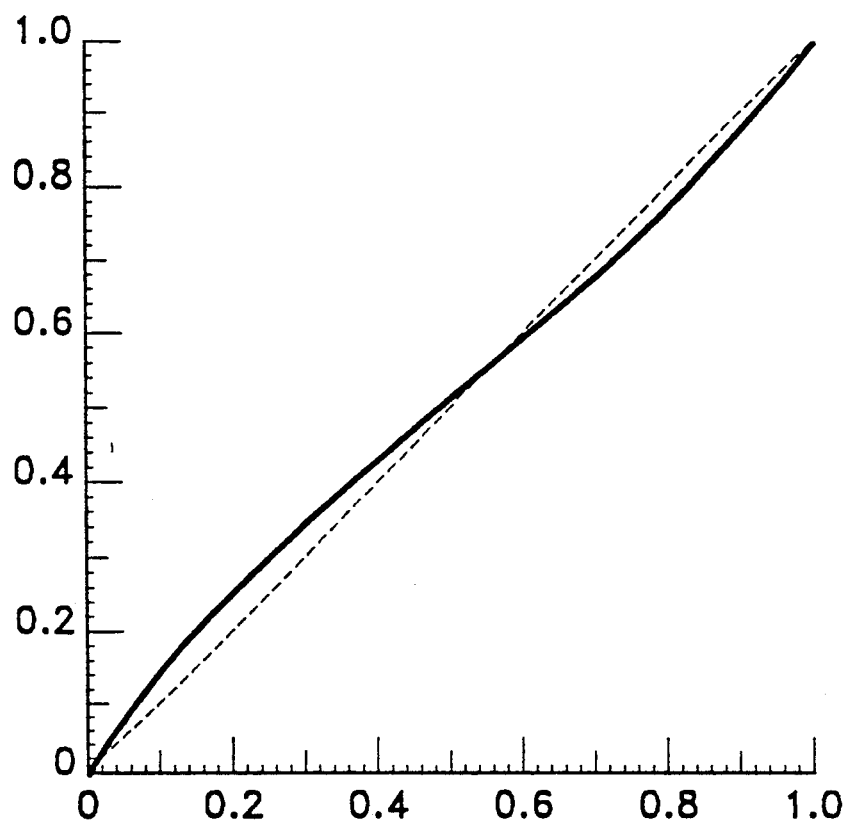
FIG. 1 and FIG. 2 each show liquid-vapor equilibria for mixtures of 1,1,1,2-tetrafluoroethane and methyl chloride.
Figure 2:
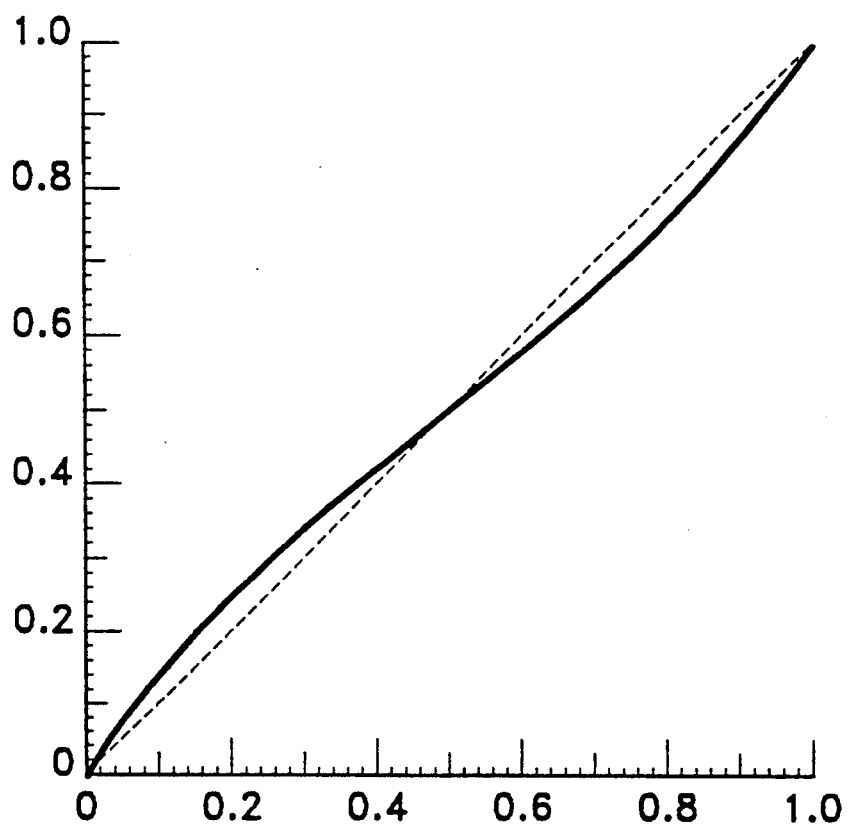

The existence of the azeotropic or pseudo-azeotropic composition containing 1,1,1,2-tetrafluoroethane and methyl chloride is established by the results of measurement of the liquid-vapour equilibrium shown in FIGS. 1 and 2.

In these figures, the abscissa represents the molar fraction of 1,1,1,2-tetrafluoroethane of the composition in the liquid phase and the ordinate represents the molar fraction of 1,1,1,2-tetrafluoroethane of this same composition in the vapour phase.

FIG. 1 has been plotted following experiments carried out at a pressure of $5 \times 10^5$ Pa and FIG. 2 at a pressure of $1.3 \times 10^5$ Pa.

The results of measurement of the liquid-vapour equilibrium are collated in Table I for the measurements carried out at a pressure of $5 \times 10^5$ Pa and in Table II for the measurements carried out at a pressure of $1.3 \times 10^5$ Pa.

In these tables:

T: represents the equilibrium temperature in °C.,
P: represents the equilibrium pressure in Pa,
X: represents the molar fraction of 1,1,1,2-tetrafluoroethane employed for the composition in the liquid phase,
Y: represents the molar fraction of 1,1,1,2-tetrafluoroethane measured for this same composition in the vapour phase.

Known quantities of 1,1,1,2-tetrafluoroethane and of methyl chloride are introduced into a measuring cell. When the liquid-vapour equilibrium is established, the equilibrium temperature and pressure are measured and the composition of the gaseous phase is determined by gas phase chromatography. The molar fraction of 1,1,1,2-tetrafluoroethane in the gaseous phase is then compared with the molar fraction of the latter employed. In the composition containing 1,1,1,2-tetrafluoroethane and methyl chloride, the gaseous phase can be richer or less rich in 1,1,1,2-tetrafluoroethane, according to the molar fraction employed. There is therefore an azeotrope between the 1,1,1,2-tetrafluoroethane and the methyl chloride, of which the measured characteristics are summarised as follows:

| Pressure kPa | Temperature °C. | Molar fraction of 1,1,1,2-tetrafluoroethane in the azeotrope |
|---|---|---|
| 508 | 13.5 | ≈0.6 |
| 130 | −23.8 | ≈0.5 |

A normal boiling point (p=101.3 kPa) of −28° to −29° C. and a composition of 0.45 to 0.5 mol of 1,1,1,2-tetrafluoroethane/mol is obtained for this azeotrope by extrapolation.

TABLE I

| T °C. | P × $10^5$ Pa | x | y | y/x |
|---|---|---|---|---|
| 13.20 | 5.07 | 0.4961 | 0.5137 | 1.0355 |
|  | 5.07 |  | 0.5140 | 1.0361 |
| 12.15 | 4.87 | 0.7190 | 0.6946 | 0.96606 |
|  | 4.87 |  | 0.6943 | 0.96565 |
| 14.93 | 5.05 | 0.9394 | 0.9216 | 0.98105 |
|  | 5.04 |  | 0.9214 | 0.98084 |
| 16.00 | 5.09 | 0.1678 | 0.2314 | 1.3790 |
|  | 5.09 |  | 0.2299 | 1.3701 |
| 14.21 | 5.06 | 0.3387 | 0.3824 | 1.1290 |
|  | 5.06 |  | 0.3820 | 1.1278 |
| 13.54 | 5.08 | 0.5980 | 0.5934 | 0.99231 |
|  | 5.05 |  | 0.5937 | 0.99281 |
| 13.95 | 5.02 | 0.8410 | 0.8131 | 0.96683 |
|  | 5.02 |  | 0.8126 | 0.96623 |
| 17.77 | 4.97 | 0.06798 | 0.1141 | 1.6784 |
|  | 4.95 |  | 0.1117 | 1.6431 |

TABLE II

| T °C. | P × $10^5$ Pa | x | y | y/x |
|---|---|---|---|---|
| −20.38 | 1.31 | 0.06798 | 0.1207 | 1.7755 |
| −22.75 | 1.31 | 0.2665 | 0.3205 | 0.2026 |
|  | 1.31 |  | 0.3113 | 0.1681 |
| −23.83 | 1.30 | 0.3698 | 0.3989 | 1.0787 |
|  | 1.29 |  | 0.3996 | 1.0806 |
| −21.03 | 1.33 | 0.1489 | 0.2120 | 1.4238 |
|  | 1.33 |  | 0.2134 | 1.4332 |
| −23.77 | 1.29 | 0.5006 | 0.5058 | 1.0104 |
|  | 1.29 |  | 0.5038 | 1.0064 |
| −24.23 | 1.30 | 0.6479 | 0.6171 | 0.95246 |
|  | 1.30 |  | 0.6168 | 0.95200 |
| −22.84 | 1.30 | 0.8027 | 0.7556 | 0.94132 |
|  | 1.30 |  | 0.7583 | 0.94469 |
| −21.67 | 1.31 | 0.9441 | 0.9196 | 0.97405 |
|  | 1.29 |  | 0.9198 | 0.97426 |

EXAMPLE 2

The theoretical performances of a refrigerating fluid under certain specific operating conditions can be estimated starting from the thermodynamic properties of the refrigerating fluid using certain standardised techniques for analysis of the refrigeration cycle. See, for example, R. C. Downing, "Fluorocarbon Refrigerants Handbook", Ch. 3, Prentice-Hall, (1988).

The coefficient of performance, the volume output and the temperature at the end of compression have been calculated for a given refrigerant cycle, characterised by a vaporisation temperature of −30° C., a superheating of the vapour of 10° C., a condensation temperature of 35° C., a zero supercooling of the liquid, an isentropic yield of 0.8, a volumetric efficiency of 0.8, and for a refrigerant power of 10 kW with dichlorodifluoromethane (R 12), 1,1,1,2-tetrafluoroethane (R 134a), methyl chloride (R 40), a mixture of R 134a/R 40 in proportions by volume of 71.5/28.5 and a mixture of R 134a/R 40 in proportions by volume of 50/50 as a refrigerating fluid.

The coefficient of performance (COP) is a particularly useful measurement for representing the relative thermodynamic efficiency of a refrigerating fluid in a specific refrigerant cycle, involving the evaporation and condensation of the refrigerating fluid. For refrigeration experts, this term represents the useful refrigerant power with respect to the energy consumed by the compressor.

The volume output of the refrigerating fluid needed to obtain a given refrigerant power reflects the capacity of the refrigerating fluid. The lower the necessary output, the more its capacity is increased. For a given compressor, the greater the capacity of the refrigerating fluid, the more the refrigerant power provided by the evaporator and delivered with the aid of a given compressor, will be increased.

The value of the temperature obtained at the end of compression is useful for judging the feasibility of the use of the refrigerating fluid in conventional compressors, conventionally being able to withstand a temperature at the end of compression of the order of 100° C. This limitation is principally a result of problems of behaviour of the oils under the effect of temperature.

The values obtained are collated in Table III

TABLE III

| Refrigerating fluid | % Volume | C.O.P. | Volume output (m³/h) | Mass output (kg/sec) | Temperature at end of compression (°C.) |
|---|---|---|---|---|---|
| CFC-12 | 100 | 2.24 | 68.6 | 0.092 | 72 |
| R 134a | 100 | 2.16 | 77 | 0.072 | 66.5 |
| R 40 | 100 | 2.34 | 69.8 | 0.029 | 155 |
| R 134a/R40 | 71.5/28.5 | 2.23 | 66 | 0.06 | 78.3 |
| R 134a/R40 | 50/50 | 2.28 | 62 | 0.051 | 91 |

EXAMPLE 3

The limits of solubility of some lubricating oils as a function of temperature have been measured in a mixture of R 134a/R 40 (71.8/28.2 vol %).

The oils tested are 2 oils of the ester type, marketed by DEA Mineralöl AG under the trade names Triton SEZ 22 and Triton SE 55. The first of these oils is an oil of viscosity class ISO VG 22, well adapted for use in refrigerators; the second is an oil of viscosity class ISO VG 46-68, intended for mobile air conditioning systems and for refrigerated transport units.

The oil Triton SEZ 22 is completely soluble in the mixture R 134a/R 40 down to −60° C. In comparison, in R 134a alone, at −57° C., the solubility of this oil is only 10% by weight.

The results obtained for the oil Triton SE 55 are presented in Table IV, on the one hand in the mixture R 134a/R 40, and on the other hand in pure R 134a.

TABLE IV

| Refrigerant | Temperature 10% solubility | Temperature 20% solubility |
|---|---|---|
| R 134a/R 40 | −55° C. | −41° C. |
| R 134a | −18° C. | −7° C. |

We claim:

1. A composition consisting essentially of:
   48 mol % of 1,1,1,2-tetrafluoroethane (± −1 mol %); and
   52 mol % of methyl chloride, wherein the composition forms an azeotrope having a boiling point which rises to −28.5° C. (± −1° C.) at a pressure of 101.3 kPa.

2. A process of making a porous polystyrene, comprising:
   including in the polystyrene a porogenic agent consisting essentially of 48 mol % of 1,1,1,2-tetrafluoroethane (± −1 mol %); and 52 mol % of methyl chloride, which is an azeotrope having a boiling point which rises to −28.5° C. (± −1° C.) at a pressure of 101.3 kPa.

3. A process for producing refrigeration, comprising:
   condensing a refrigerating fluid consisting essentially of 48 mol % of 1,1,1,2-tetrafluoroethane (± −1 mol %); and 52 mol % of methyl chloride, which is an azeotrope having a boiling point which rises to −28.5° C. (± −1° C.) at a pressure of 101.3 kPa; and
   thereafter evaporating said refrigerating fluid.

4. A process of producing a foam comprised of a polymer selected from the group consisting of a polyurethane and a polyolefin, comprising:
   foaming the polymer with a blowing agent consisting essentially of 48 mol % of 1,1,1,2-tetrafluoroethane (± −1 mol %); and 52 mol % of methyl chloride, wherein the composition forms an azeotrope having a boiling point which rises to −28.5° C. (± −1° C.) at a pressure of 101.3 kPa.

* * * * *